United States Patent [19]

Glaser

[11] 4,167,295

[45] Sep. 11, 1979

[54] MAGNETIC THRUST FORCE RELIEF FOR A FOIL BEARING TURBOMACHINE

[75] Inventor: Jerry Glaser, Playa del Rey, Calif.

[73] Assignee: The Garrett Corporation, Los Angeles, Calif.

[21] Appl. No.: 858,869

[22] Filed: Dec. 8, 1977

[51] Int. Cl.² .................. F16C 17/10; F16C 32/04; F16C 39/06

[52] U.S. Cl. .................................. 308/9; 308/160; 308/DIG. 1; 415/170 R

[58] Field of Search .............. 417/407, 424, 365; 308/DIG. 1, DIG. 15, 9–10, 160, 73, 163–172, 35; 415/205, 104, 107, 1, 170 R, 111; 60/597, 605

[56] References Cited

U.S. PATENT DOCUMENTS

| | | | |
|---|---|---|---|
| 3,377,113 | 4/1968 | Wilson | 308/10 |
| 3,893,733 | 7/1975 | Silver et al. | 308/9 |
| 3,918,773 | 11/1975 | Tuffias | 308/9 X |
| 3,951,573 | 4/1976 | Dunning et al. | 308/9 X |

Primary Examiner—Douglas C. Butler
Attorney, Agent, or Firm—Albert J. Miller

[57] ABSTRACT

A foil bearing turbomachine including magnetic relief of the thrust forces and static friction imposed on the foil thrust bearing during start up of the turbomachine.

10 Claims, 2 Drawing Figures

MAGNETIC THRUST FORCE RELIEF FOR A FOIL BEARING TURBOMACHINE

BACKGROUND OF THE INVENTION

Process fluid or gas bearings have now been utilized for some time in an ever increasing number of diverse applications. These fluid bearings, which generally comprise two relatively movable elements with a predetermined spacing therebetween, operate under dynamic conditions to form a supporting wedge of fluid therebetween sufficient to prevent contact between the two relatively movable members.

Improved fluid bearings, particularly bearings of the hydrodynamic type, have been developed by providing foils in the space between the relatively movable bearing elements. These foils, of a generally thin sheet of a compliant material, are deflected by the hydrodynamic film force between adjacent surfaces. The foils thus enhance the hydrodynamic characteristics of the fluid bearings and enable operation under more extreme load conditions than heretofore had been possible with fluid bearings.

The ready availability of relatively clean process fluid or ambient atmosphere as the bearing fluid makes these hydrodynamic, fluid film lubricated bearings particularly attractive for high speed rotating machinery both as journal bearings and as thrust bearings. While in many cases the hydrodynamic or self-acting fluid bearings provide sufficient load bearing capacity solely from the pressure generated by the fluid film wedge formed by the relative rotation of the two converging surfaces, in some cases it is necessary to externally pressurize the fluid introduced between the bearing surfaces so as to further increase the load carrying capacity. These externally pressurized or hydrostatic fluid bearings do however introduce the requirement for an external source of clean fluid under pressure.

Illustrative of hydrodynamic and hydrostatic bearing patents assigned to the same assignee of this application are U.S. Pat. Nos.: 3,215,479, 3,215,480, 3,366,427, 3,375,046, 3,382,014, 3,434,761, 3,434,762, 3,467,451, 3,511,544, 3,560,064, 3,615,121, 3,635,534, 3,642,331, 3,677,612, 3,893,733, 3,951,474, and 3,957,317.

One of the problems inherent in these fluid film bearings, whether hydrostatic or hydrodynamic or whether enhanced with foils between the relatively movable bearings elements, is the initial start up of the bearing. While the introduction of the compliant foils has greatly reduced the inherent problems of start up and low speed operations, conditions still arise which make start up of such bearings difficult. The foils, being resilient, are better able to withstand the effects of frictional contacts but substantial forces can still be imposed upon them which in some cases may have the tendency to tear the foils or even yank them loose from their positioning arrangements.

One means which has been developed to overcome the inherent problems of start up and low speed operation has been the coating of the individual foil elements with a high lubricity material such as a fluorocarbon or stratified fluorocarbon. Such coatings have greatly reduced the start up loads and rubbing contacts for such bearings. These coatings are generally described in U.S. Pat. No. 3,677,612, assigned to the assignee of this application.

While the use of a high lubricity coating has further alleviated the inherent start up problems of these foil bearings, certain high speed rotating machinery applications still present difficulties particularly for thrust bearings or bearings having a thrust component. Typically, the start up of a foil bearing turbomachine is accomplished by passing high pressure air from an external source through the turbine. This flow of high pressure air will set up thrust forces on the rotating assembly which can significantly increase the frictional contact of the foil bearings. With increased static friction, higher torque is required for start up of the turbomachine which means higher gas pressure which tends to further increase the thrust forces and static friction. Because of this self-magnifying effect, it may be difficult to establish the dynamic fluid film and, in extreme cases, it may be impossible to start the turbomachine. In any case, the increased static friction from the thrust forces will accelerate bearing wear.

SUMMARY OF THE INVENTION

The invention described herein provides for the utilization in a turbomachine of magnetic means to relieve the thrust forces imposed upon a fluid film foil thrust bearing during start up of the turbomachine.

DESCRIPTION OF THE PREFERRED EMBODIMENTS

Figure 1:
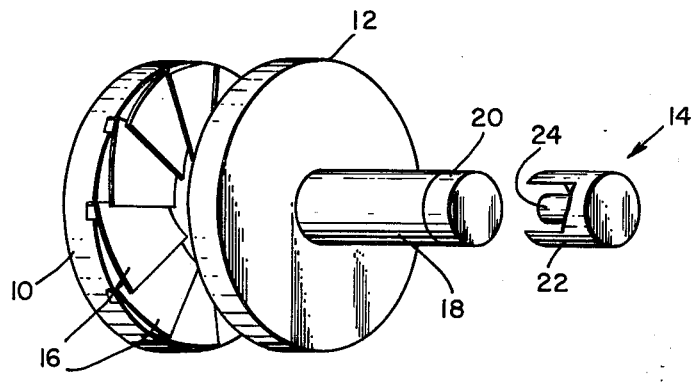
FIG. 1 is an exploded perspective view of the thrust bearing portion of a turbomachine of the present invention.

As generally illustrated in FIG. 1, the thrust bearing portion of the foil bearing turbomachine of the present invention generally comprises a thrust plate 10, a thrust runner 12, and a magnet assembly 14. The thrust plate 10 includes a plurality of individual bearing foils 16 shown as mounted directly on the thrust plate 10 to extend slightly outward therefrom. These foils 16 can, however, be mounted in a number of different fashions, and there may be included various intermediate elements between the foils 16 and the thrust plate 10. Reference should be made to U.S. Pat. Nos. 3,615,121, 3,635,534 and 3,677,612 for a description of these different methods of mounting the foils 16 in the thrust plate 10.

The thrust runner 12 includes a shaft 18 having an end portion 20 of a ferromagnetic material such as steel. The magnet assembly 14 comprises a cylindrical cup-shaped ferromagnetic member 22 in which a centrally disposed cylindrical permanent magnet 24 is mounted opposite the ferromagnetic end portion 20 of shaft 18.

In operation, the thrust plate 10 and magnet assembly 14 are stationary, while the thrust runner 12 and shaft 18 rotate. The magnet assembly 14 will relieve thrust forces between the outwardly projecting foils 16 on the thrust runner 12 and the opposite surface of the thrust runner 12 to enable rotation of the thrust runner 12 and shaft 18 to be accomplished.

Figure 2:
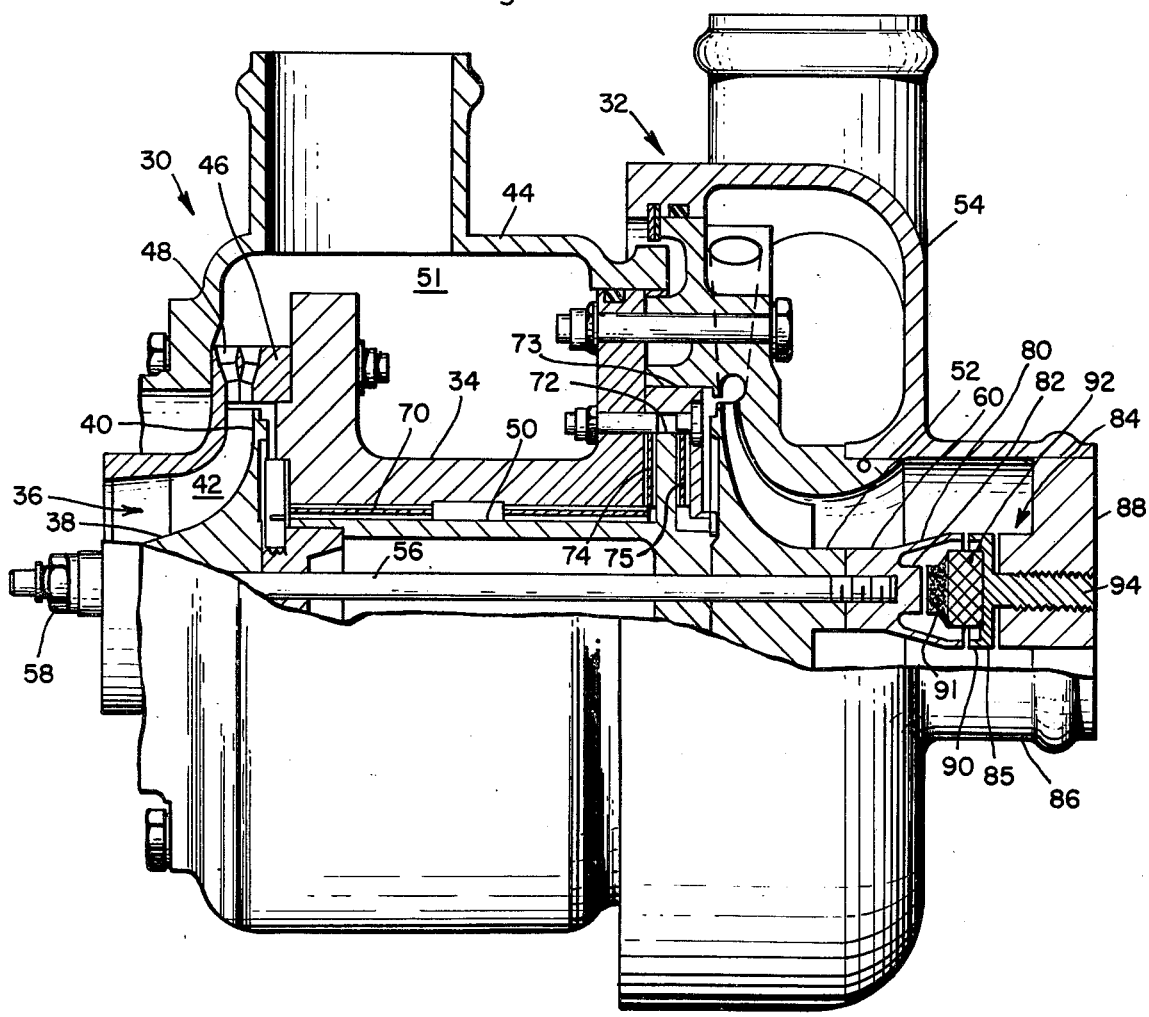
FIG. 2 is a sectional view of the foil bearing turbomachine of the present invention.

While in FIG. 1 there is a general representation of the thrust bearing portion of the turbomachine of the present invention, FIG. 2 illustrates a complete turbomachine assembly, including a turbine 30 and compressor 32 disposed around a center housing 34. The turbine 30 generally comprises a turbine wheel 36 having a hub 38 and backplate 40 between which are disposed a plurality of blades 42. A turbine housing 44, including a nozzle ring 46, is generally disposed around the turbine wheel 36. Individual nozzles 48 in the nozzle ring 46 providing a working fluid from the turbine housing torus 51 to the turbine blades 42 so as to induce rotation of the turbine wheel 36.

The turbine wheel 36 is mounted on a hollow cylindrical shaft 50 which extends through the center housing 34. Disposed at the opposite end of the center housing 34 is compressor 32, including compressor impeller 52 mounted on shaft 50. Disposed around the compressor impeller 52 is the compressor housing 54.

The turbine wheel 36 and compressor impeller 52 are mounted on the shaft 50 by means of a threaded rod 56, which extends completely through the turbine wheel hub 38, shaft 50 and compressor impeller 52. The turbine wheel 36 is held at one end by means of a threaded nut 58, while the compressor impeller 52 is held at the opposite end of the threaded rod 56 by means of a threaded nut 60.

The shaft 50 is disposed to rotate within the center housing 34 on foil journal bearings 70. The shaft 50 includes a thrust runner 72, which forms a thrust bearing between the compressor end of the center housing 34 (a first thrust plate) and a thrust bearing cover assembly 73 (a second thrust plate) disposed next to the compressor housing 54. A first plurality of individual foil elements 74 are disposed between the center housing 34 and one side of the thrust runner 72 and a second plurality of individual foil elements 75 are disposed between the thrust bearing cover assembly 73 and the other side of the thrust runner 72. The journal bearing and the thrust bearing may be of any conventional foil bearing structure, for example, as described in U.S. Patent Application Ser. No. 689,612, filed May 24, 1976, entitled "Improved Foil Bearing" and assigned to the same assignee as this application.

The threaded nut 60 attached to the compressor end of the threaded rod 56 is of a generally flared deep cup-shaped configuration of a ferromagnetic material such as steel. Nut 60 includes a flared annular wall portion 80 and recessed central pad 82 therein. The magnet assembly 84 is mounted by means of a spider-like support web 88 in the compressor inlet 86 in juxtaposition to the threaded nut 60. The magnet assembly 84 generally comprises a shallow cup-shaped member 85 having walls 90 oppositely disposed to the walls 80 of the threaded nut 60 and a centrally projecting permanent magnet 92 including a smaller diameter soft iron pole piece 91 oppositely disposed to the pad 82 of the threaded nut 60. The permanent magnet 92, of a material such as samarium cobalt is axially movable with respect to the support 88 and threaded nut 60 by means of a self-locking adjusting screw 94 extending from the base of the shallow cup-shaped member through the support 88.

During start up of the turbomachine, high pressure air or gas is directed against the turbine wheel 36 through nozzles 48. When first introduced, this high pressure air establishes a pressure between the back of the turbine wheel plate 40 and the center housing 34. This pressure, which can easily reach several psig, exerts a thrust force which will tend to displace the turbine wheel 36 and hence the thrust runner 72 to the left. The thrust force and resultant leftward movement will increase the static friction between the left side of the thrust runner and the plurality of bearing foils 74 mounted on the center housing 34 adjacent the thrust runner 72. This static friction can, in some cases, be so great as to prevent start up of the turbomachine, and even if start up is permitted, the increased static friction will increase the accelerated wear upon the bearing foils 74.

The magnetic assembly 84 at the compressor end of the turbomachine will exert a force counter to the gas pressure force at start up and thus will relieve the static friction between the foils and the thrust runner. A flux path is developed between the magnet assembly and the threaded nut by means of the central magnet and pad and the cup walls of these elements. The smaller diameter pole piece concentrates the flux path to the rotating shaft element. The gap between the magnet assembly and the threaded nut, adjustable by means of adjusting screw 84, can be varied to regulate the force provided by magnet 92. By mounting the magnet on a spider-like web, the pressure loss of the air flowing through the compressor inlet is held to a minimum.

The magnet assembly is designed to enable start up of the turbomachine and does not provide any discernible loss in power once the shaft is rotating freely. The magnet assembly does provide a secondary benefit as a stabilizing influence on the performance of the journal bearings, apparently as the result of the preloading on the thrust bearing during operation.

While specific embodiments of this invention have been illustrated and described, it is understood that these are provided by way of example only. While the invention is shown as used with a thrust bearing, it should be readily apparent that it is equally applicable to a conical bearing which has a thrust force component. The invention is to be construed as to being limited only by the proper scope of the following claims:

What is claimed is:

1. A turbomachine comprising:

a housing;

a rotatable wheel mounted on a shaft and disposed within said housing;

bearing means to rotatably support said rotatable wheel within said housing, said bearing means including a foil thrust bearing to axially restrain said rotatable wheel; and magnetic means operably associated with said housing and said rotatable wheel to reduce the static friction on the foil thrust bearing of said bearing means, said magnetic means comprising a ferromagnetic generally flared cup-shaped nut threaded to one end of the rotatable wheel shaft, said generally flared cup-shaped nut including a generally cylindrical recessed pad disposed therein, and a permanent magnet means mounted within said housing in juxtaposition to said ferromagnetic end nut.

2. The turbomachine of claim 1 wherein said magnetic means additionally includes means to adjust the distance between the ferromagnetic end nut of said rotatable wheel shaft and the permanent magnet means.

3. A turbomachine comprising:

a housing;

a rotatable wheel mounted on a shaft and disposed within said housing;

bearing means to rotatably support said rotatable wheel within said housing, said bearing means including a foil thrust bearing to axially restrain said rotatable wheel; and magnetic means operably associated with said housing and said rotatable wheel to reduce the static friction on the foil thrust bearing of said bearing means, said magnetic means comprising a ferromagnetic end portion on said rotatable wheel shaft and a permanent magnet means mounted within said housing, said permanent magnet means being a generally cylindrical shallow cup-shaped member having a generally cylindrical permanent magnet centrally projecting therefrom in juxtaposition to said ferromagnetic end portion of said rotatable wheel shaft.

4. The turbomachine of claim 3 wherein said permanent magnet means additionally includes a generally cylindrical pole piece of a smaller diameter than said generally cylindrical permanent magnet disposed between the permanent magnet and the ferromagnetic end portion of said rotatable wheel shaft.

5. The turbomachine of claim 4 wherein said magnetic means additionally includes means to adjust the distance between the ferromagnetic end portion of said rotatable wheel shaft and the permanent magnet means.

6. The turbomachine of claim 3 wherein said magnetic means additionally includes means to adjust the distance between the ferromagnetic end portion of said rotatable wheel shaft and the permanent magnet means.

7. A turbomachine comprising:
a housing;
a rotatable wheel mounted on a shaft and disposed within said housing;
bearing means to rotatably support said rotatable wheel within said housing comprising a foil journal bearing and a foil thrust bearing, said foil thrust bearing including a rotatable thrust runner disposed on the rotatable wheel shaft, a first thrust plate disposed on one side of said thrust runner, a second thrust plate disposed on the other side of said thrust runner, a first plurality of compliant foils disposed between said first thrust plate and said thrust runner, and a second plurality of compliant foils disposed between said second thrust plate and said thrust runner; and
magnetic means operably associated with said housing and said rotatable wheel to reduce the static friction on the foil thrust bearing of said bearing means, said magnetic means comprising a ferromagnetic end portion on said rotatable wheel shaft including a generally flared cup-shaped nut threaded to the rotatable wheel shaft and having a generally cylindrical recessed pad disposed therein, and a permanent magnet means mounted within said housing and including a generally cylindrical shallow cup-shaped member having a generally cylindrical permanent magnet centrally projecting therefrom in juxtaposition to said generally cylindrical recessed pad disposed in the generally flared cup-shaped nut of said ferromagnetic end portion of said rotatable wheel shaft, said permanent magnet means including means to adjust the distance between the ferromagnetic end portion of said rotatable wheel shaft and the permanent magnet means.

8. A turbomachine comprising:
a compressor housing having an axial inlet and an outlet;
a rotatable compressor wheel mounted on a shaft and disposed within said compressor housing;
bearing means, including a foil thrust bearing to axially restrain said rotatable compressor wheel, to rotatably support said wheel within said housing, the foil thrust bearing comprising a rotatable thrust runner mounted on said shaft, a first thrust plate disposed within said housing on one side of said thrust runner, a second thrust plate disposed within said housing on the other side of said thrust runner, a first plurality of compliant foils disposed between said first thrust plate and said thrust runner, and a second plurality of compliant foils disposed between said second thrust plate and said thrust runner; and
magnet means operably disposed within the axial inlet of the compressor housing to reduce the start-up static friction between the compliant foils and the thrust plates,
said magnet means comprising a ferromagenetic member disposed on one end of said rotatable compressor wheel shaft and a permanent magnet means mounted within said housing in juxtaposition to said ferromagnetic member wherein said permanent magnet means additionally includes means to adjust the distance between the rotatable compressor wheel shaft and the permanent magnet means.

9. The turbomachine of claim 8 wherein said permanent magnet means is a generally cylindrical shallow cup-shaped member having a generally cylindrical permanent magnet centrally projecting therefrom in juxtaposition to the rotatable compressor wheel shaft.

10. A turbomachine comprising:
a compressor housing having an axial inlet and an outlet;
a rotatable compressor wheel mounted on a shaft and disposed within said compressor housing;
bearing means, including a foil thrust bearing to axially restrain said rotatable compressor wheel, to rotatably support said wheel within said housing, the foil thrust bearing comprising a rotatable thrust runner mounted on said shaft, a first thrust plate disposed within said housing on one side of said thrust runner, a second thrust plate disposed within said housing on the other side of said thrust runner, a first plurality of compliant foils disposed between said first thrust plate and said thrust runner, and a second plurality of compliant foils disposed between said second thrust plate and said thrust runner; and
magnetic means operably disposed within the axial inlet of the compressor housing to reduce the start-up static friction between the compliant foils and the thrust plates, said magnetic means comprising a ferromagnetic end portion on said rotatable compressor wheel shaft including a generally flared cup-shaped nut threaded to the shaft and having a generally cylindrical recessed pad disposed therein, and a permanent magnet means centrally, mounted within the axial inlet of said compressor housing and including a generally cylindrical shallow cup-shaped member having a generally cylindrical permanent magnet centrally projecting therefrom in juxtaposition to said generally cylindrical recessed pad disposed in the generally flared cup-shaped nut of said ferromagnetic end portion of said rotatable compressor wheel shaft, said permanent magnet means including means to adjust the distance between the ferromagnetic end portion of said rotatable compressor wheel shaft and the permanent magnet means.

* * * * *